United States Patent [19]

Nishino et al.

[11] Patent Number: 4,664,238
[45] Date of Patent: May 12, 1987

[54] ELECTROMAGNETIC COUPLING DEVICE

[75] Inventors: Hiroshi Nishino; Kiyohide Okamoto; Ryosuke Okita, all of Himeji, Japan

[73] Assignee: Mitsubishi Denki Kabushiki Kaisha, Tokyo, Japan

[21] Appl. No.: 790,085

[22] Filed: Oct. 22, 1985

[30] Foreign Application Priority Data

Nov. 8, 1984 [JP] Japan .................. 59-169612[U]
Nov. 22, 1984 [JP] Japan .................. 59-177724[U]

[51] Int. Cl.$^4$ ................ F16D 27/00; F16D 65/14
[52] U.S. Cl. ................... 192/84 C; 192/48.2; 192/84 B
[58] Field of Search ............ 192/48.2, 48.5, 84 B, 192/84 C

[56] References Cited

U.S. PATENT DOCUMENTS 4,508,203  4/1985  Packard et al. .............. 192/84 C
4,569,426  2/1986  Sekella et al. ............... 192/84 C

FOREIGN PATENT DOCUMENTS 2638944  3/1978  Fed. Rep. of Germany .... 192/84 C
26583    7/1977  Japan .
928599   6/1963  United Kingdom .............. 192/84 C Primary Examiner—William F. Pate, III
Assistant Examiner—R. Chilcot
Attorney, Agent, or Firm—Oblon, Fisher, Spivak, McClelland & Maier

[57] ABSTRACT

An electromagnetic coupling device comprises a shaft member made of a non-magnetic material having a low frictional resistance, a yoke mounted on the shaft member so as to be capable of relatively rotating to the shaft member, an exciting coil held in the yoke, a first coupling body mounted on the shaft member so as to be incapable of relatively rotating, and a second coupling body mounted on the shaft member so as to be capable of relatively rotating to the shaft member and controlled to be connected to the first coupling body by actuating the exciting coil.

6 Claims, 4 Drawing Figures

ELECTROMAGNETIC COUPLING DEVICE

BACKGROUND OF THE INVENTION

1. Field of the Invention

The present invention relates to an electromagnetic coupling device used, for instance, for feeding papers in a copy machine. More particularly, it relates to an electromagnetic coupling device used under condition of a reduced load such as a transmission torque of about 5 kg.cm and number of revolution at the input side of about 200 rpm.

2. Description of the Prior Art

FIG. 1 shows a conventional electromagnetic coupling device. In FIG. 1, a reference numeral 1 designates a stator in a form of a yoke holding therein a coil 2. The stator 1 is immovably engaged with a stationary member (not shown). A rotor 3 which is a first coupling body fixedly securing a lining 4 is attached by forcibly fitting to a hollowed rotary shaft 5 made of magnetic substance such as iron. A hub 6 provided with a gear wheel 7, which is usually formed by molding plastic material or by sintering powder of an alloy, is directly attached to the rotary shaft 5 so as to be able to relatively rotate. A returning leaf spring 8 is secured to the hub 6. An armature 9 as a second coupling body is fixed to the leaf spring 8 by a rivet 10 at a position opposing the lining 4. A predetermined gap g is formed between the armature 9 and the rotor 3. A reference numeral 11 designates an iron series metal inserted between the stator 1 and the rotary shaft 5, a numeral 12 designates a spacer, numerals 13, 14 designates retaining rings fitted to the rotary shaft 5 to fix positions of the stator 1, the rotor 3 and the hub 6 in the axial directions.

In the conventional electromagnetic clutch constructed as above-mentioned, when a current is supplied to the exciting coil 2 while the gear wheel 7 is driven by a motor (not shown), a magnetic flux $\phi$ is produced to form a magnetic circuit in elements constituting the electromagnetic clutch as shown in FIG. 1, whereby the armature 9 is attracted to the rotor 3 against the spring action of the leaf spring 8. Rotation at the driving side is transmitted to the rotary shaft 5 through the rotor 3 via the hub 6, the leaf spring 8, the armature 9 and the lining 4. The rotary shaft 5 transmits a rotational force to a driven shaft 16 which is fitted to the hollowed rotary shaft 5. When supply of a current is stopped, the magnetic flux $\phi$ disappears and the armature 9 is separated from the rotor 3 by the spring action of the leaf spring 8; thus the rotary shaft 5 is stopped.

In the conventional electromagnetic clutch, since the rotary shaft 5 contributes to formation of the magnetic circuit, it is necessary to use soft iron having an excellent magnetizing characteristic. Accordingly, it is necessary to interpose a metal 11 between the rotary shaft 5 and the stator 1 which also contributes formation of the magnetic circuit since it is difficult to made the rotary shaft and stator to be in a direct slide-contacting state. Insertion of the metal 11 provides such disadvantages that frictional resistance at the sliding portion becomes large; a magnetic attractive force of the magnetic circuit produces a resistance of rotation between the stator 1 and the metal 11 thereby resulting in relative rotation between the stator and the metal; and abrasion caused in the sliding portion does not impart a sufficient performance for a long term.

Since the metal 11 also contributes formation of a magnetic circuit, it is difficult to use material other than an iron series metal (including one coated with a sliding agent). Further, the rotary shaft 5 made of soft iron becomes rusty whereby faulty sliding movement may take place. For rustproof effect, zinc plating is sometimes employed as a method of treatment of surface. However, it is not satisfactorily reliable since hardness of zinc is low. It is also considered to use nickel plating, chromium plating and so on. However, this expedient has the drawback of being expensive. In addition, machining operations of the rotary shaft 5 are not easy because the rotary shaft is made of soft iron. Two grooves for retaining rings have to be formed in the rotary shaft 5 since the retaining rings 13, 14 are required to fix the stator 1, the rotor 3 and the hub 6 in the axial directions. Accordingly, efficiency in manufacturing the electromagnetic coupling device is lowered.

SUMMARY OF THE INVENTION

It is an object of the present invention to provide an electromagnetic coupling device having wear-resistance properties, which is capable of easily machining and of a low manufacturing cost.

The foregoing and the other objects of the present invention have been attained by providing an electromagnetic coupling device which comprises a shaft member made of a non-magnetic material having a low frictional resistance, a yoke mounted on the shaft member so as to be capable of relative movement to the shaft member, an exciting coil held in the yoke, a first coupling body mounted on the shaft member so as to be axially spaced from said yoke incapable of relative rotation to said shaft, the first coupling body inclduing a pole part axially overlapping the yoke at a position radially within the yoke, and a second coupling body mounted on the shaft member so as to be capable of rotation relative to the shaft member and controlled to be connected to the first coupling body by actuating the exciting coil, wherein a magnetic circuit includes a radial air gap between the pole part and the yoke.

DETAILED DESCRIPTION OF THE PREFERRED EMBODIMENTS

Figure 1:
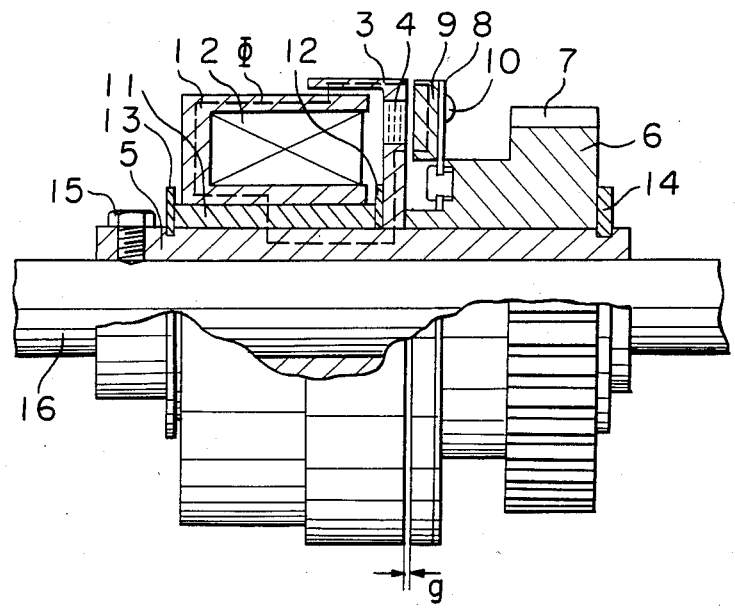
FIG. 1 is a cross-sectional view partly broken of a conventional electromagnetic coupling device.
Figure 2:
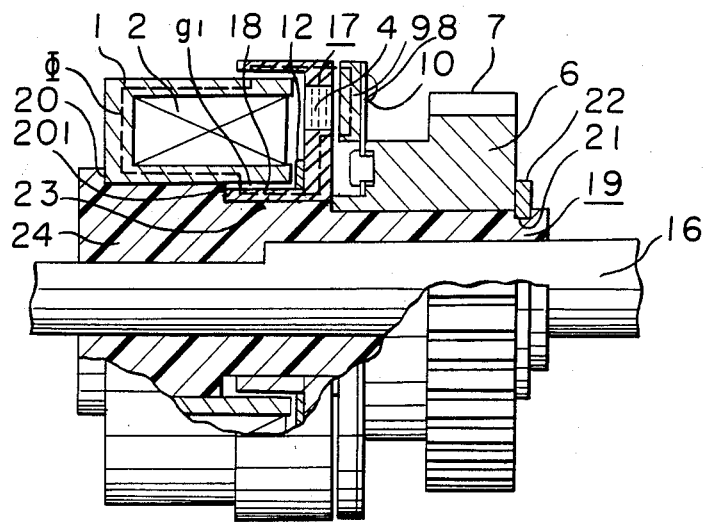
FIG. 2 is a cross-sectional view partly broken of an embodiment of the electromagnetic coupling device according the present invention.

An embodiment of the present invention will be described with reference to drawing. FIG. 2 shows in cross-section an embodiment of the present invention in which the same reference numerals as in FIG. 1 designate the same parts. Detailed description of the parts indicated by the same reference is, therefore, omitted.

A rotor 17 made of a magnetic material is provided at its base portion with a magnetic pole part 18 extending around the outer circumferential surface of a rotary shaft 19 toward a stator 1. There is formed a gap $g_1$ between the stator 1 and the outer surface of the magnetic pole part 18 of the rotor 17 so that a magnetic flux $\phi$ passes from the stator 1 through the gap $g_1$ to the magnetic pole part 18. The rotary shaft 19 is made of an oil-containing plastics as a non-magnetic substance. The rotary shaft is adapted to be in slide-contact with the inner circular surfaces of the stator 1 and the hub 6 and is relatively rotatable with respect to them. The rotary shaft 19 is provided at its outer circumferential surface with shoulder portions 20, 201 and an annular groove 21. A retaining ring 22 is fitted to the annular groove 21. The shoulder portions 20, 201 respectively fix positions of the stator 1 and the rotor 17, and the retaining ring 22 determines the position of the hub 6 in association with the groove 21 in the axial direction.

Figure 3:
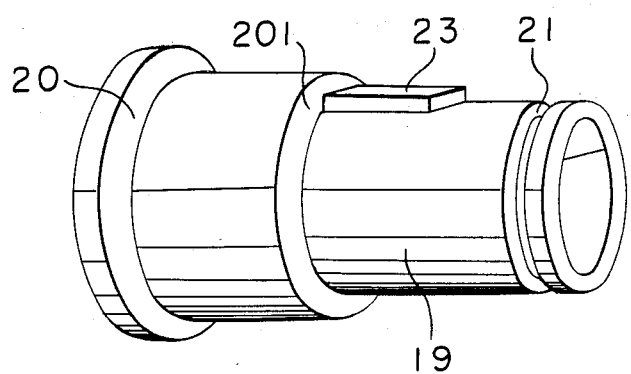
FIG. 3 is a perspective view of a shaft member in FIG. 2.
Figure 4:
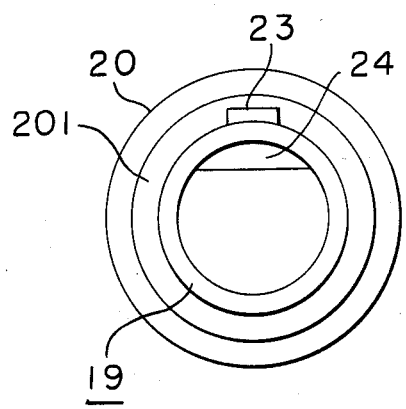
FIG. 4 is a front view of the shaft member in FIG. 3.

As shown in FIG. 3, an elongated projection 23 is formed on the outer circumferential surface of the rotary shaft 19 at a position corresponding to the inner circumferential surface of the rotor 17 so that the projection 23 is fitted to a recess formed in the inner circumferential surface of the rotor 17. Accordingly, the rotor 17 is held by the rotary shaft 19 so as not to relatively rotate to the rotary shaft 19. A fitting portion 24 is formed integrally with the inner circumferential surface of the rotary shaft 19 so as to fit a D-cut portion formed in the outer circumferential surface of a driven shaft 16 as shown in FIG. 4.

The operation of the electromagnetic coupling device of the present invention will be described. When a current is fed to the exciting coil 2 in the condition of the gear wheel 7 being driven, a magnetic flux $\phi$ is produced to form a magnetic circuit as shown in FIG. 2. The magnetic circuit is formed in the course of the stator 1, the gap $g_1$, the rotor 17, the armature 9, the rotor 17, and the stator 1. As a result, the armature 9 is attracted to the rotor 17 and rotation of a driving means is transmitted to the rotary shaft 19 through the hub 6, the armature 9 and the rotor 17. Rotation of the rotary shaft 19 causes rotation of the driven shaft 16 since the driven shaft 16 is connected to the rotary shaft 19 by means of the fitting portion 24 and the D-cut portion. When supply of the current is stopped, the armature 9 is disengaged from the rotor 17 thereby stopping the rotary shaft 19.

In the present invention, since the rotary shaft 19 is made of an oil-containing plastics, it is possible that the rotary shaft 19 is directly in contact with and is rotatable to the stator 1 without interposing a metal. Since the rotatary shaft 19 is made of a rustproof material, it is unnecessary to apply to the rotary shaft 19 expensive rustproof treatment. Long term use of the magnetic clutch of the present invention is possible without impairing excellent properties of slide and rotation.

Since the rotor 17 is magnetically coupled to the stator 1 through the magnetic pole part 18 of the rotor 17, there is no problem of occurrence of a magnetic attractive force between the rotary shaft 19 and the stator 1.

In the embodiment of the present invention, the shoulder portions 20, 201, the groove 21 and the fitting portions 23, 24 are formed integrally with the rotary shaft 19. Accordingly, assembling operations of the stator 1, the rotor 17 and the hub 6 to the rotary shaft 19 and assembling operations of the rotary shaft 19 to the driven shaft 16 can be easy. Further, machining operations are remarkably reduced since the rotary shaft 19 can be manufactured by molding an oil-containing plastic resin.

The same function of sliding and rotating can be obtained when the rotary shaft 19 is made of a resinous material containing a lubricating agent such as "MOLYKOTE" (trademark by DOW CORNING INC.), instead of the oil-containing plastics. A rotary shaft made of polyacetal resin may be sufficient when the rotary shaft is used for an electromagnetic coupling device having a extremely low revolutional speed. Contrary, when an electromagnetic coupling device having a relatively high speed and heavy duty is to be used, a resinous material containing carbon fibers is preferably used for the rotary shaft. For material of the rotary shaft, it is effectively used as far as it is made of non-magnetic material having a low frictional resistance so that the rotary shaft is directly in contact with and is slidable to the stator 1.

What is claimed is:

1. An electromagnetic coupling device which comprises a shaft member made of a non-magnetic material having a low frictional resistance, a yoke slidably mounted on said shaft member so as to be capable of rotating relative to said shaft member, an exciting coil held in said yoke, a first coupling body mounted on said shaft member so as to be axially spaced from said yoke and incapable of rotating relative to said shaft member, said first coupling body including a pole part axially overlapping said yoke at a position radially within said yoke, and a second coupling body mounted on said shaft member so as to be axially spaced from said yoke and said first coupling body and capable of rotating relative to said shaft member and controlled to be connected to said first coupling body by actuating said exciting coil, wherein a magnetic circuit comprising said yoke, said first coupling body and said second coupling body includes a radial air gap between said yoke and said pole part of said first coupling body, whereby no frictional forces are applied therebetween during said actuation of said exciting coil.

2. An electromagnetic coupling device according to claim 1, wherein said shaft member is made of plastics.

3. An electromagnetic coupling device according to claim 1, wherein said shaft member is made of oil-containing plastics.

4. An electromagnetic coupling device according to claim 1, wherein said shaft member is made of a material containing carbon fibers as a main component.

5. An electromagnetic coupling device according to claim 1 wherein said yoke is mounted on said shaft member so as to be slidable on said shaft member, wherein an engaging portion for position-determination of one of said yoke, said first coupling body and said second coupling body is formed in the outer circumferential part of said shaft member, and a fitting portion is formed in the inner circumferential part of said shaft member so that relative rotation of a rotating body to be fitted in the inner circumferential part is prevented.

6. An electromagnetic coupling device according to claim 5, wherein said rotating body is a driven shaft inserted in said shaft member.

* * * * *